Aug. 27, 1940.  W. H. SMILA ET AL  2,212,753
REAMING TOOL
Filed April 11, 1938
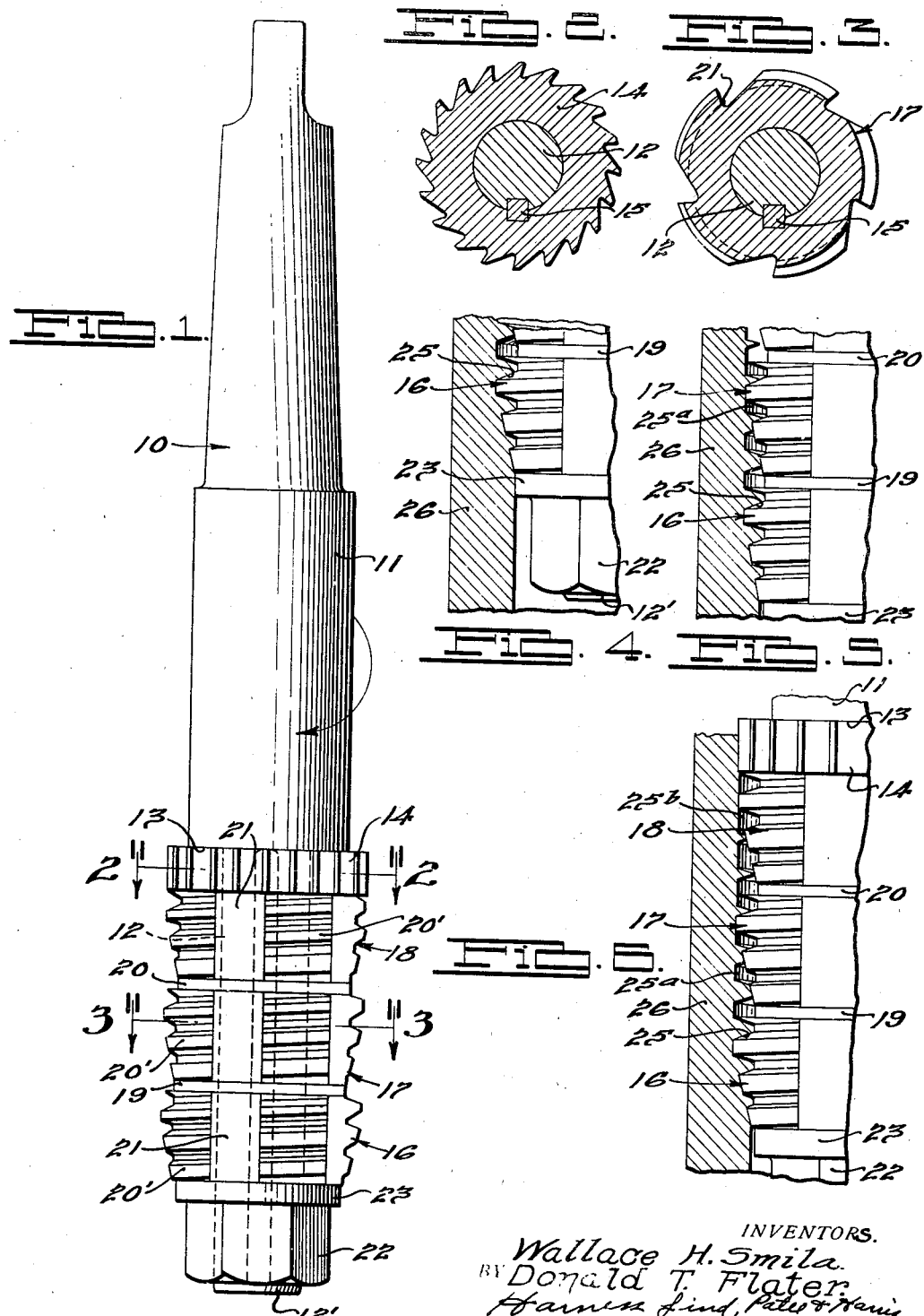
INVENTORS.
Wallace H. Smila.
BY Donald T. Flater.
Harness, Lind, Pater & Harris
ATTORNEYS.

Patented Aug. 27, 1940

2,212,753

UNITED STATES PATENT OFFICE 2,212,753

REAMING TOOL

Wallace H. Smila and Donald T. Flater, Detroit, Mich., assignors to Chrysler Corporation, Highland Park, Mich., a corporation of Delaware Application April 11, 1938, Serial No. 201,216

4 Claims. (Cl. 77—72)

This invention relates to improvements in apparatus for and method of reaming or boring of material, particularly holes of relatively great depth.

One of the main objects of the invention is the provision of a tap-like reaming tool which has a plurality of axially spaced cutting edges by which the work being reamed is operated upon at a plurality of correspondingly spaced locations so that the cutting action, heat and chips resulting therefrom are distributed throughout a substantially large zone of the work.

Another object of the invention is the provision of a plurality of axially arranged tap-like cutting members in a tool of this kind, each of which cuts a spiral passage immediately adjacent the spiral passage formed by the preceding cutting member until all the material of the work has been removed between adjacent turns of the spiral passage formed by the first cutter to which the work is subjected.

A further object of the invention is the provision in a reaming tool of a plurality of helical passage cutting members of this kind which may be of the same pitch but so spaced axially of the tool that it is adapted to cut in a helical path immediately adjacent and overlapping the path cut by the preceding cutting member.

A still further object of the invention is the provision in a reaming tool of greater space for chip accommodation than has heretofore been available.

An additional object of the invention is the provision of a tool of this kind by which comparatively deep holes may be reamed and inlayed in diameter by a relatively large amount at a high rate of speed without requiring repeated withdrawal of the tool to remove chips from the work.

Another object of this invention is the provision of a reaming or boring tool of this kind which, by reason of its rotation during operation, has a positive self-feeding action but which may be applied to the work under pressure of the machine in which it is employed.

Still further objects of the invention are the provision of an improved method by which a sleeve of metal can be quickly removed from the wall of a cylindrical bore in a step-by-step fashion; to provide a method of this kind during the practice of which all the advantages of internal thread cutting tapping operations are obtainable while successively cutting helical passages in the work until a cylindrical sleeve-like portion thereof of predetermined thickness has been removed; and to provide an improved reaming method by which smooth surfaces can be quickly formed on the surfaces of the work operated upon.

Other objects and advantages of the invention will be more apparent from the following description taken in connection with the accompanying drawing, in which:

Fig. 1 is an elevational view of a reaming or boring tool embodying the invention.

Fig. 2 is a horizontal sectional view taken along the line 2—2 of Fig. 1.

Fig. 3 is a horizontal sectional view taken approximately as indicated by the line 3—3 of Fig. 1.

Fig. 4 is an enlarged, fragmentary sectional view of the first cutter member shown in Fig. 1 and illustrating the manner in which this cutter member cuts a spiral passage in the material bounding a hole being reamed.

Fig. 5 is an enlarged, fragmentary sectional view corresponding to Fig. 4, but illustrating the manner in which the second cutter member widens the spiral passage initially formed by the first cutter member.

Fig. 6 is an enlarged, fragmentary sectional view corresponding to Figs. 4 and 5, but illustrating the manner in which the third cutter member removes all of the metal from between the adjacent turns of the spiral path which has been previously widened by the second cutter member.

In the form of the invention illustrated in the drawing, the improved reamer or boring tool is generally designated by the numeral 10 and comprises a shank portion 11 having a reduced end section 12 extending from a shoulder 13 on the shank portion 11 and terminating in a threaded end portion 12'. The shank portion 11 is adapted to be rotated and the tool may also be applied to the work under pressure or fed by a suitable drill press or other machine (not shown).

A finish cutter member 14 is non-rotatably secured, preferably by a spline or key 15, on the reduced end section 12 and bears against the shoulder 13. A series of similar spiral cutter members 16, 17 and 18 which are spaced by washers 19 and 20 are also mounted on the end section 12 of the shank and held against rotation relative thereto by the spline 15. The cutters 16 to 18 and finish cutter 14 are held in assembled relation on the shank 12 by a nut 22 threaded on the end portion 12' of the shank. The cutters 16 to 18 are of tap-like construction and each cutter has an interrupted spiral thread-like periphery provided by a spirally arranged series of cutting teeth 20' between which notches 21 are formed. In this respect the cutters resemble hob cutters and their maximum diameters are substantially equal to the diameter desired of the hole in the work being reamed. The finish cutter may be omitted, if desired, and if used, its diameter is preferably only slightly larger than the maximum diameter of the cutters 16 to 18, inclusive.

As the first cutter member 16 enters a hole to be reamed, or bored, its thread-like periphery cuts a helical groove 25 in the work 26 as shown in Fig. 4. The second cutter member 17, which is the same pitch as the cutter member 16, is spaced from the cutter member 16 by the washer 19 and as it enters the work it widens the groove 25ª cut by the cutter member 16 an amount equal to the thickness of the washer 19 as shown in Fig. 5. The same action takes place when the last cutter member 18 enters the work inasmuch as it is spaced from the cutter member 17 by the washer 20, and as it enters the work it widens the groove 25ᵇ cut by the cutter members 16 and 17 (best shown in Fig. 6).

By properly predetermining the thicknesses of the washers 19 and 20 and the pitch of the threads of cutters 16, 17 and 18, it is possible to remove a continuous sleeve of metal from the wall of the hole being bored in a step-by-step manner so that the total cutting of material of the work at any time is distributed throughout a substantial portion of the work thereby reducing the generation of heat and concentration of chips. The second and subsequent cutter members successively widen the groove cut by the first cutter member until the land of this groove is removed prior to the travel of the finish cutter member 14 through the work, thus the material removed by these cutters is readily accommodated in the previously formed groove, and the notch 21 is called upon to accommodate the chips removed by the first cutting member 16. It is to be understood that any number of cutter members may be used and that the thickness of the teeth thereof may vary in the respective cutters. The washers 19 and 20 may also differ in thickness, but to remove a complete sleeve of material, their total thickness should be at least equal to the base of the thread left by the first cutter.

The ample space provided for chip accommodation eliminates repeated withdrawal of the tool for cleaning purposes during deep reaming operations and the distribution of the cutting action facilitates fast reaming or boring operations without excessive heating of the tool or work and without excessively stressing the cutting edges of the tool. The tool may therefore, if desired, be formed from less expensive metal and less precision is required in its treatment during manufacture. The period of life of the tool and utility between resharpening operations is materially prolonged.

Although pressure of the tool in the direction of its length facilitates starting of the first cutter, after the latter has formed a thread, rotation of the tool may be relied upon to feed the tool to the work. This self-feeding action of the tool reduces the requirements of the machine in which it is employed.

The amount or depth of cutting performed by each cutter may be predetermined by varying the number of cutters and the number of cutters which operate simultaneously on the work may be controlled by properly spacing the cutters. If desired the cutters may be so arranged that one cutter commences just prior to completion of the cut by the preceding cutter, in order to keep the torque required to operate the tool within suitable limits. This is accomplished with the tool disclosed when reaming work of suitable thickness.

Various modifications and changes in the illustrated applications may be effected without departing from the spirit of the invention or from the scope of the appended claims.

What we claim is:

1. A tool comprising a main body portion and a longitudinally arranged series of cutter sections thereon each having a spiral thread cutting peripheral portion, the end cutter of said series including a plurality of successive spirally contoured and spirally aligned cutting teeth and the cutter sections successively adjacent said end cutter section comprising a plurality of successive spirally contoured and spirally aligned cutting teeth offset axially with respect to the course of the teeth of the preceding cutter section and so constructed and arranged as to progressively entirely cut away the material of the thread formed by operation of said end cutter section on a piece of work by cutting away portions of only one of the walls of the grooves between adjacent portions of the turns of said thread.

2. A tool comprising a main body portion, and a longitudinally arranged series of operatively adjacent cutter sections thereon having thread cutting peripheral portions of substantially equal pitch, the thread cutting portions of said cutter sections being spaced apart longitudinally of said tool by an amount less than the pitch of said cutter sections for completely removing the thread formed by the first cutter section and adapted to operate upon a piece of work by feeding the thread cutting tool of each section into cutting engagement with only one side of the thread left on the work by the preceding cutting element.

3. A tool comprising a main body portion and a longitudinally arranged series of cutter sections thereon, the cutter section of the leading end of said tool having tapering thread cutting peripheral elements for initially cutting a thread in the wall of a cylindrical bore during passage of said tool through said bore, the next adjacent cutter section being provided with thread cutting peripheral elements having portions spirally misaligned with respect to said first mentioned elements for cutting depthwise and radially of said bore into the thread formed by said first cutter section.

4. The method of reaming a passage in a piece of work which comprises tapping a portion of said passage to form a helical thread on the wall thereof having a depth substantially corresponding to one-half the diametrical enlargement of said passage desired, and simultaneously removing said thread from an adjacent portion of said work in successive increments while continuing to tap said passage in advance of the previously formed thread by cutting depthwise into only one side of the thread at a series of locations spaced axially of said passage.

WALLACE H. SMILA.
DONALD T. FLATER.